United States Patent [19]
Witt et al.

[11] Patent Number: 5,916,610
[45] Date of Patent: Jun. 29, 1999

[54] NPN DELIVERY SYSTEM AND METHOD FOR PREPARING SAME

[75] Inventors: Paul R. Witt; Randall K. Dew, both of Muscatine, Iowa

[73] Assignee: Grain Processing Corporation, Muscatine, Iowa

[21] Appl. No.: 08/922,421

[22] Filed: Sep. 3, 1997

[51] Int. Cl.$^6$ .................................................. A23K 1/22
[52] U.S. Cl. ................... 426/69; 426/2; 426/807
[58] Field of Search .................. 426/2, 69, 807

[56] References Cited

U.S. PATENT DOCUMENTS

| | | | |
|---|---|---|---|
| 3,416,928 | 12/1968 | Freese | 99/2 |
| 3,635,725 | 1/1972 | Baskin et al. | 99/2 |
| 3,878,304 | 4/1975 | Moore | 426/69 |
| 3,934,041 | 1/1976 | Snyder | 426/69 |
| 3,935,260 | 1/1976 | Schlosser | 260/553 |
| 3,940,493 | 2/1976 | Fox | 426/69 |
| 4,006,253 | 2/1977 | Berger et al. | 426/69 |
| 4,035,479 | 7/1977 | George, Jr. et al. | 426/78 |
| 4,044,156 | 8/1977 | Diner et al. | 426/69 |
| 4,055,598 | 10/1977 | Lee | 260/553 |
| 4,089,980 | 5/1978 | Berger et al. | 426/69 |
| 4,095,000 | 6/1978 | Brenner | 426/656 |
| 4,109,019 | 8/1978 | Moore | 426/69 |
| 4,232,046 | 11/1980 | Deyoe et al. | 426/69 |
| 4,483,877 | 11/1984 | Moore | 426/54 |
| 4,818,269 | 4/1989 | Young | 71/83 |
| 4,888,185 | 12/1989 | Miller | 426/72 |
| 4,994,284 | 2/1991 | Miller | 426/74 |
| 5,021,247 | 6/1991 | Moore | 426/69 |
| 5,254,673 | 10/1993 | Cook et al. | 530/375 |
| 5,637,312 | 6/1997 | Tock et al. | 424/438 |

*Primary Examiner*—Chhaya D. Sayala
*Attorney, Agent, or Firm*—Leydig, Voit & Mayer, Ltd.

[57] ABSTRACT

Disclosed is an NPN delivery system for a ruminant animal, the system comprising a complex of a zein-containing species or other proteinaceous species with a nitrogenous species. The NPN from the nitrogenous species is present in the complex in a form such that at least a portion of the NPN is not initially bioavailable to the rumen upon introduction of the system into the rumen of the ruminant animal. Preferably, the delivery system comprises a complex of urea with corn gluten. Also disclosed are methods for preparing an NPN delivery system for a ruminant animal.

28 Claims, No Drawings

NPN DELIVERY SYSTEM AND METHOD FOR PREPARING SAME

TECHNICAL FIELD OF THE INVENTION

The invention is in the field of non-protein nitrogen (NPN) delivery systems for ruminant animals. More particularly, the invention is directed towards a controlled-release NPN delivery system suitable for use as a ruminant animal feed, and towards a method for preparing an NPN delivery system.

BACKGROUND OF THE INVENTION

It has long been known that non-protein nitrogen (NPN) can be incorporated into feed for ruminant animals as a substitute for protein sources. The most common source of NPN for ruminant animal feed is urea. Urea can be digested by ruminant animals and converted into bacterial protein by ureases present in the rumen of the animal. The bacterial protein is in turn liberated and used by the animal after the bacteria leave the rumen and enter the small intestine of the animal.

Intermediate steps in this process include the conversion of urea to ammonia and the conversion of ammonia to amino acids. The conversion of urea to ammonia in the rumen occurs more rapidly than the conversion of ammonia to amino acids. If ammonia is generated too rapidly in the rumen, not all of the ammonia will be converted to amino acids, thus resulting in wastage of some of the nutrient value of the urea. Moreover, excess ammonia may be released into the bloodstream of the rumen, causing alkalosis and possibly illness or death of the animal.

The prior art has recognized that these problems may be alleviated if the urea in the ruminant feed is released, i.e., made bioavailable to ureases in the rumen, at a controlled rate approximately equal to or less than the rate of conversion of ammonia to protein. U.S. Pat. Nos. 3,934,041, 4,035,479, 4,109,019, and 4,994,284 discuss these and other advantages of slow urea release from ruminant feeds. In keeping with this understanding, the prior art has provided several attempts to provide ruminant feeds that allow NPN from urea or other sources to be released at a controlled rate. Examples of such attempts are described, for example, in U.S. Pat. Nos. 3,940,493, 4,044,156, and 4,232,046.

Many of these prior art attempts are somewhat unsatisfactory. For example, U.S. Pat. No. 4,044,156 discloses urease-resistant glucosyl ureides for ruminant feeds. The ureides are prepared when glucose and urea react under acidic drying conditions. While these ureides allow urea to be released at a controlled rate, the nutritive value of the ureides is limited. Similarly, U.S. Pat. No. 3,934,041 provides a method for binding urea to an aldehyde using molasses. While the aldehyde-bound urea is nutritive, the nutritive value of the other components in the feed material is limited.

It is a general object of the invention to provide an NPN delivery system for a ruminant animal. It is another general object of the invention to provide a method for preparing an NPN delivery system for a ruminant animal.

SUMMARY OF THE INVENTION

The foregoing general objects can be achieved by providing a ruminant feed material including a nitrogenous species for providing bioavailable nitrogen to a ruminant animal, the nitrogenous species provided in the form of a complex with a proteinaceous species, preferably a zein-containing species. It has been found that a zein-containing species, such as corn gluten, may combine with a nitrogenous species, such as urea, to form a complex, where the complex is suitable for use as an NPN delivery system for a ruminant animal. In accordance with the invention, the non-protein nitrogen from the nitrogenous species will be present in the complex in a form such that at least a portion of this non-protein nitrogen will not be initially bioavailable to the ruminant upon introduction of the system to the rumen. In one preferred embodiment, about 60–75% of the NPN in the complex is released in the rumen after about two hours of residence time in the rumen fluid, the remainder remaining not bioavailable to the ruminant animal during this time.

The invention also encompasses a method for preparing an NPN delivery system for a ruminant animal, including, in one embodiment, the steps of providing a liquid medium including a proteinaceous species and a nitrogenous species, at least a portion of the proteinaceous species being soluble in said liquid medium; and de-solubilizing said proteinaceous species to form a complex of said proteinaceous species with said nitrogenous species. The step of de-solubilizing the zein may be performed in a batch process, but preferably is performed in an extrusion process. In accordance with an embodiment of the invention, the method comprises the steps of providing an aqueous medium including a zein-containing species and a nitrogenous species; adjusting the pH of the solution to a value of at least about pH 9.0; and thereafter lowering the pH of the solution to form a complex of the zein-containing species with the nitrogenous species. The complex thus formed should then be dried to a moisture content of below about 10% and ground to yield a ruminant feed material. The NPN delivery system thus prepared will be suitable for use as an ammonia delivery system for a ruminant animal.

Other features and objects of the invention will be apparent from the following description of the invention and appended claims.

DESCRIPTION OF THE INVENTION

The invention includes a complex of a nitrogenous species and a proteinaceous species. In accordance with the invention, the nitrogenous species may be any species that provides bioavailable NPN to a ruminant animal upon the introduction of the nitrogenous species to the rumen of the ruminant animal. Generally, the nitrogen will be provided in the form of ammonia or ammonium ion, although it is contemplated that NPN could be provided in the complex in other forms. In the preferred embodiment of the invention, the nitrogenous species is urea, a species that supplies NPN to the rumen in the form of ammonia. Urea will be acted upon by bacterial ureases within the rumen, and converted to bacterial amino acids. The bacteria will subsequently pass into the small intestine of the ruminant animal, where the bacteria will liberate the bacterial amino acids to the animal.

Other nitrogenous species useful in conjunction with the invention include other sources of nonprotein nitrogen (NPN), such as, for example, acetamide, ammonia, biuret, butyramide, creatine, creatinine, dicyanoamide, formamide, ethylene urea, isobutanol diurea, lactosyl urea, propionamide, uric acid, and urea phosphate. It is further contemplated that ammonium salts may find utility in conjunction with the invention, although such are less preferred. Suitable ammonium salts may include the acetate, bicarbonate, carbamate, carbonate, chloride, citrate, formate, fumerate, lactate, maleate, phosphate, polyphosphate, propionate, succinate, and sulfate ammonium salts, or any other suitable ammonium salt. The invention is not intended to be limited to the foregoing nitrogenous species, and indeed any nitrogenous species providing NPN to a ruminant animal may be used in conjunction with the invention.

In accordance with the invention, at least a portion of the nitrogenous species in the NPN delivery system is provided in the form of a complex with a proteinaceous species. The proteinaceous species may be any species that functions to form a complex with a nitrogenous species in accordance with the invention. Preferably, the proteinaceous species is a zein-containing species. Any seed extract containing zein, a seed protein, may be used in conjunction with the invention. For example, zein alone may be used. However, in the preferred embodiment of the invention, the zein-containing species is corn gluten, a highly nutritive corn protein. Corn gluten is commonly obtained from wet milling of corn, and is commonly available as either 40% or 60% protein meal. Corn gluten is particularly advantageous because of its ready commercial availability, nutritive value, and other beneficial values in ruminant animals. For example, gluten is available postruminally for enzymatic digestion and subsequent absorption of amino acids. Thus, when corn gluten is employed as the zein-containing species in conjunction with the invention, the system will have a highly nutritive value.

The nature of the complex of the invention has not been ascertained with precision. While it is not intended to limit the invention to a particular theory of operation, it is believed that zein or other protein present in the protein-containing species will render initially insoluble at least a portion of the nitrogenous species in the NPN delivery system, and that at least a portion of the initially insoluble nitrogenous species will not be immediately bioavailable in the rumen. The zein or other protein may serve to render the nitrogenous species insoluble with a physical coating. It is further believed that the complexed nitrogen will be released to the animal slowly as compared with the rate of release of the nitrogenous species in the non-complexed form. However, while this theory represents the current belief of the inventors, the complex may in fact be otherwise characterized. For example, it is possible that the nitrogenous species in the complex is chemically bound to the zein-containing species, and thus the nitrogenous species may be chemically altered. Regardless of the manner in which the invention operates, however, the system of the invention should be suitable for use as an NPN delivery system for ruminant animals.

In accordance with the invention, at least a portion of the NPN present in the delivery system is not immediately bioavailable to the rumen upon ingestion of the complex. It is believed that at least that portion of the NPN that is bound to the zein-containing species in the complex and that is thereby rendered initially insoluble will not be immediately bioavailable in the rumen. By "not immediately bioavailable" is meant that the nitrogenous species will become converted to bacterial amino acids in the rumen at a rate that is limited by the release of NPN from the complex, i.e., that the release of NPN from the complex is rate-limiting in the generation of amino acids in the rumen. Such rate of release may be contrasted with the rate of release of unmodified nitrogenous species, in which the rate of conversion of ammonia to bacterial amino acids is rate-limiting in the generation of amino acids.

Any amount of the nitrogenous species in the system may be present in complexed form with the zein-containing species or other proteinaceous species. Preferably, from about 10% to about 20% of the nitrogenous species in the system is complexed with the zein-containing species, based on the 100% of the nitrogenous species in the system. More preferably, from about 30% to at least about 40% is so complexed.

The nitrogenous species should be present in the NPN delivery system in any proportion consistent with providing an NPN delivery system in which at least a portion of the NPN in the system is not immediately bioavailable to the ruminant animal upon introduction of the system to the rumen. Preferably, NPN from the nitrogenous species is present in the system in an amount ranging from about 2% to about 20% by weight based on 100% total weight of the system. More preferably, about 12% to about 17% by weight is so present. By "present in the system" is meant to encompass all of the NPN present on a dry basis in the system, and not just that portion of the NPN in the nitrogenous species that itself is coated with the zein or otherwise present in the form of a complex. Thus, for example, when the nitrogenous species is urea, the urea preferably is present in the delivery system in a nominal amount ranging from about 4% to about 40% based on the weight of the complex, and more preferably is present in an amount ranging from about 6% to about 34% by weight. In some preferred embodiments, the urea may be present in an amount ranging from about 9% to about 30%; more preferably, from about 6% to about 20% by weight.

When the system of the invention, including a complex of corn gluten and urea, is fed to a ruminant animal, it is believed that about 60% to about 75%, preferably about 62% to about 72%, and most preferably about 65% of the NPN available from the urea will be converted to ammonia within the rumen and thereby made bioavailable to the animal within two hours of ingestion. In contrast, when unmodified urea is ingested by a ruminant animal, virtually 100% of the NPN from the urea will be immediately bioavailable to the animal, depending of course upon the amount of urea fed to the animal and other conditions. It is believed that the reduced rate of NPN delivery to the rumen afforded by the system of the invention will be rate-limiting in the generation of bacterial amino acids within the rumen.

The ammonia delivery system may further include other components for providing nutritional, medicinal, or other benefits to the ruminant animal. For example, if desired, one or more amino acids may be incorporated in the NPN delivery system. The amino acid may comprise any amino acid that is of nutritional or other benefit to a ruminant, and may include, for example, lysine, methionine, leucine, and arginine. If one or more amino acids are present in the complex, they may be present in any desired amount consistent with providing a nutritional benefit to a ruminant animal. Preferably, the amino acid or acids, if present, are present in a total amount ranging from about 0.01% up to about 15% by weight, more preferably from about 3% to about 15% by weight, most preferably from about 4% to about 8%. It should be noted however, that the inclusion of such amino acids in the complex is wholly optional. It is contemplated that still further components also optionally may be present in the complex including, for example, vitamins or other nutritional supplements. Such components, if present, may be included in any suitable amount, for example, an amount ranging from about 0.01% up to about 1% by weight.

The invention also encompasses methods for preparing a complex of a nitrogenous species and a proteinaceous species. In one embodiment wherein the proteinaceous species is a zein-containing species, the method of invention may be practiced by combining the zein-containing species and the nitrogenous species in a liquid medium at a pH of sufficient basicity to solubilize the zein in the zein-containing species, then de-solubilizing the zein to thereby form a complex of the zein-containing species with the nitrogenous species. When the solubilizing step occurs with a pH adjustment, it has been found that an acceptable pH value for solubilizing the zein is a basicity of at least about pH 9, more preferably about pH 9.5, still more preferably about pH 10.5. The temperature of the medium should be maintained at a level between about 60° C. and about 80° C. to assist information of the complex, more preferably, about 65° C. to about 75° C., even more preferably about 72° C. to about 75° C. When urea is used as the nitrogenous species, temperatures above about 75° C. are less preferred, inasmuch as ammonia may be released from the urea.

To de-solubilize the zein, the pH may be lowered to a value sufficient to render the zein insoluble. For example, the pH of the medium may be lowered to a pH of below about pH 9, preferably below about pH 8.5, more preferably to a pH of about 6.5–7.5. It has been observed that the pH of the medium will be lowered naturally in some embodiments of the present inventive method. The reason for this lowering of pH is not known with certainty. It is believed that the lowering of pH may be due either to the presence of bisulfite or other processing residues from commercially available corn gluten, which residues become activated in elevated temperatures. Alternatively, the lowering of pH possibly may be due to the release of amino acids or other organic acids from the corn gluten. If the natural lowering of pH is not sufficient to de-solubilize the zein, an inorganic acid, such as HCl or $H_3PO_4$, or an organic acid, such as acetic acid, formic acid, propionic acid, or lactic acid, may be added to the aqueous medium. An NPN delivery system will be formed upon drying the wet urea and gluten mixture.

While the method has been described with respect to the theory of operation currently understood by the inventors, the method is understood to be operative regardless of the correctness of such understanding. Thus, in one embodiment, the method of the invention comprises the steps of providing an aqueous mixture of a zein-containing species and a nitrogenous species, the mixture having a pH greater than about pH 9.0, and subsequently reducing the pH of the mixture to thereby form a complex of the zein-containing species with the nitrogenous species. Prior to lowering the pH of the mixture, the temperature of the mixture preferably is maintained at about 60° C. for a time of at least about 10 minutes, for example, 15 minutes or 20 minutes. After the pH has been reduced, preferably to a level of about pH 7.0 to 7.5, the temperature preferably is increased to about 70° C. to about 80° C. to assist in formation of the complex.

While the foregoing methods have been described with respect to zein-containing species, it should be appreciated that these methods are contemplated to be equally applicable to other proteinaceous species, such as sorghum gluten. It should further be appreciated that the methods are contemplated to be applicable to nitrogenous species other than urea.

The method of the invention may be performed in a batch vessel operation, or may be performed in a continuous operation, such as in an extruder or pelletizer. Thus, for example, when the method of the invention is practiced as a batch process, a corn gluten suspension and an aqueous urea solution may be separately prepared. The solution and suspension each should be brought to a pH of about 9.1 to about 12, preferably about pH 10 to pH 11, most preferably about pH 10.5. Subsequently, the urea solution should be added to the gluten suspension, and the mixture then maintained at a temperature of between 40° C. and about 60° C.

The mixture should be maintained at this temperature for a time sufficient to allow formation of the complex. While some complex may be formed almost instantaneously, it is preferred to maintain the temperature at an elevated level for a time of at least about 10 minutes, more preferably for a time ranging from about 15 to about 20 minutes. After this time has passed, the pH of the mixture may then be reduced to a value of from about pH 6.5 to about pH 7.5, preferably, about pH 7.0 to 7.2, using a dilute acid. The wet suspension then may be dried to form an NPN delivery system and ground to a particle size suitable for animal feed.

Although the method of the invention may be practiced as a batch process, the method of the invention is preferably performed in a continuous extrusion process. In accordance with the preferred mode of the invention, a solution of urea and a dry mixture of gluten and a basic salt (preferably sodium carbonate) are directed toward a mixing chamber, where they are subjected to mechanical energy input preferably ranging from about 140 kJ/kg to about 145 kJ/kg and temperatures ranging from about 60° C. to about 80° C. The urea solution and extruder barrel preferably are preheated to a temperature of about 60° C. It has been observed that the temperature of the mixture will rise with the energy of mixing. Preferably, the temperature in the mixing chamber will rise to a level of from about 60° C. to about 75° C., most preferably from about 72° C. to about 75° C. Supplemental heating and/or cooling may be providing necessary to reach the optimum temperatures.

The ingredients should be provided to the mixing chamber in amounts sufficient to render a 30% moisture content by weight in the extruder. The pH of the aqueous mixture in the extruder should initially be a pH of at least about pH 9, more preferably, at least about pH 10. The ingredients may be mixed for a time effective for the pH of the mixture to be lowered to a level sufficient to de-solubilize the zein, occurring within the residence time of the extrusion. Acid may be added, if necessary, to assist in lowering the pH, as discussed above with respect to the batch process. After mixing, the mixture is passed through an extruder. A thermoplastic mass of NPN delivery system is collected, which mass then may be dried and ground. Preferably, the moisture content of the dried product is less than about 10%, more preferably less than about 7.5%.

It has been observed that the method of the invention yields initially a thermoplastic mass, which mass dries to form a hard, brittle product. It is believed that the formation of such a thermoplastic mass is highly desirable in the formation of a complex of urea with the corn gluten, whether in the batch vessel process or in the extrusion process. For example, the product of the batch process may be dried to a moisture content of about 30%, whereupon the product will be a tacky mass. Upon drying and further moisture loss, the brittleness of the product will increase. In the extrusion process, the material exiting the extruder at 70° to 75° C. will be in the form of a malleable plastic mass. Upon cooling, this material will become brittle. Brittleness is desired when the product is to be used as an animal feed, inasmuch as the brittle product may easily be ground.

The product may be ground to any particle size suitable for feeding to a ruminant animal. Preferably, the maximum particle size of the NPN delivery system is between about 10 and about 30 mesh. The exact particle size is not critical, and the selection of a particular particle size will be a matter of choice for the animal nutritionist.

When a complexed NPN delivery system is prepared with urea in accordance with the invention, it is observed that some of the urea in the delivery system generally will be immediately soluble in water or rumen fluid, and thus will be immediately bioavailable in the rumen. Thus, when the NPN delivery system is introduced into the rumen of a ruminant animal, that portion of the nitrogenous species that is immediately bioavailable will not be rate limiting in the generation of bacterial amino acids. At least a portion of the urea, however, will be resistant to the enzyme urease, and will not be immediately bioavailable in the rumen. The rate of release of this urea will be limiting in the generation of bacterial amino acids in the rumen.

Some of the urea will be resistant to the urease even after the complex has been in the rumen fluid for over one hour. It is not known whether this portion of the urea will be released in the rumen or elsewhere of the animal, or will pass through the animal undigested. It is believed, however, that this portion of the urea will ultimately be released to the animal. Such urea portion is considered to be "not immediately bioavailable" to the rumen within the scope of the invention.

The invention further encompasses methods, for providing NPN to a ruminant animal, the methods including a step of providing an NPN delivery system to the ruminant animal.

The invention is illustrated further by the following examples, none of which should be construed as limiting the scope of the invention.

EXAMPLE 1

Batch Process

This example illustrates a batch process in accordance with one embodiment of the invention.

To a 1 Kg aliquot of water having a pH of 12.5 and a temperature of between 40° C. and 50° C. is suspended one kilogram of essentially dry corn gluten obtained from a commercial wet milling process. As supplied, the corn gluten contains about 10% moisture. The pH of the suspension is adjusted to about pH 10 to about pH 11, preferably about pH 10.5.

To a separate 300 g aliquot of water is dissolved 100 g to 300 g of urea. The pH of this solution then is adjusted to a value of between pH 10 and pH 11, preferably about pH 10.5. The gluten suspension and urea solution are mixed, and the resulting suspension is held for a length of time at 60° C. The length of time preferably is about 12 to about 20 minutes, and more preferably is about 15 to about 20 minutes.

A dilute solution of $H_3PO_4$ is made by diluting 40 ml concentrated $H_3PO_4$ to 90 ml with water. This solution is added to the suspension to reduce the pH to about 6.5 to 7.5, preferably, about 7.0 to 7.2. Alternatively, another inorganic acid, such as HCl, or an organic acid, such as formic acid, may be used to lower the pH. An NPN delivery system including a complex of the gluten and urea is formed upon lowering of the pH.

The suspension containing the urea/gluten complex is dried in a forced air oven at 70° to 75° C. to a moisture content below about 10%. The dried mass is then ground to 20 mesh. The resulting NPN delivery system is suitable for use as a ruminant feed material.

EXAMPLE 2

Batch process

This example illustrates a second batch processes in accordance with the invention.

In 800 ml water was dissolved 800 g urea. The pH of this urea solution was adjusted to pH 11.2 with 5M NaOH. Separately, 2000 g dry gluten was suspended in 2000 ml water, and the pH of this solution was adjusted to about pH 10.5, again with 5M NaOH.

In separate runs, the urea solution and gluten suspension were mixed at the proportions shown in the table below. In each case, the pH was maintained at pH 10.0–10.5, and the temperature maintained at 40° to 50° C. for 30 minutes. It was observed that the pH of the solution became lowered with time, so the pH was checked about every five minutes and adjusted with 5M NaOH.

After 30 minutes, the pH of each mixture was adjusted to about pH 7.0–7.2 with dilute HCl or $H_3PO_4$. Each mixture then was dried in a 75° C. oven, cooled, and ground.

| Run | Parts urea (per 100 parts urea + gluten) |
|---|---|
| 2A (control) | 0 |
| 2B | 9.4 |
| 2C | 16.6 |
| 2D | 28.5 |

Forty grams of the dry product of each run were ground to 60 mesh for analytical purposes. Urease incubation was performed according to the analytical method of A.A.O.C., Tenth Edition at p. 330 (1985). The dry, ground product was slurried in 160 ml water and agitated with urease for one hour at room temperature. The slurry was then centrifuged and the clear liquid evaluated for nitrogen content. The following results were observed (values are expressed as nitrogen content by weight percentage):

| Run | Urea nitrogen content (initial) | Urea nitrogen content (after urease incubation) |
|---|---|---|
| 2A | — | — |
| 2B | 3.3 | 1.65 |
| 2C | 5.5 | 2.75 |
| 2D | 8.2 | 4.05 |

These results demonstrate that, even after urease incubation for one hour, a substantial portion of nitrogen remained in the complex.

EXAMPLE 3

Batch Process

This example illustrates a third batch process in accordance with the invention.

A corn gluten suspension containing 50% solids by weight was mixed with a 50 wt. % urea solution in the form of a 72:28 gluten:urea slurry. The pH of the slurry was pH 10.5. After maintaining at a temperature of between about 60° C. and 70° C. for fifteen minutes, the pH was lowered to between about pH 6.0 to 7.0, and the resulting mass was dried in a forced air oven at 60° C. to 65° C.

Forty grams of the system were ground to pass 60 mesh, then slurried in 160 ml water and incubated with urease under agitation for one hour at room temperature. The slurry was then centrifuged and the clear liquid evaluated. It was observed that a portion of the urea added to form the complex remained complexed in the delivery system, even after urease incubation.

EXAMPLE 4

Extrusion Process

This example illustrates an extrusion process in accordance with the invention.

Sodium carbonate is dry mixed with gluten having a moisture content of 5% to 7% to form a dry "alkaline" mixture comprising from about 98% to about 99%, preferably 97%, by weight gluten. Separately, a 35% to 55% solution of urea adjusted with $Na_2CO_3$ to a pH of 11.5 to 12.5 is prepared in a stainless steel mixing tank equipped with an exit pressurized proportioning pump. Alternatively, NaOH is used to adjust the pH.

An extruder barrel is pre-heated to 72° C. to 75° C., and the gluten mixture is introduced to the extruder at a rate of 100 kg/hr based on the weight of the gluten. The urea solution is fed to the extruder at a rate sufficient to sustain a 30% to 32% moisture level in the extruder barrel. The urea concentration in the barrel ranges from 30% to 55%, and the initial pH of the solution is about pH 11.5.

After mixing, the mixture is extruded in the form of a thermoplastic, tacky mass. This mass is dried and ground to yield an animal feed product.

EXAMPLE 5

Extrusion Process

This example illustrates a second extrusion process in accordance with the invention Corn gluten meal was dry blended with sodium carbonate to yield a 3% $Na_2CO_3$ mixture. Separately, 110 lb. (50 kg) of urea was added to 143 lb. (65 kg) water to form a 43% urea solution. The solution was heated to a temperature of about 60° C., and the pH was adjusted to about pH 10.0.

To the premix chamber of a Wegner TX-52 twin screw extruder with the barrel temperature at 75° C. was added the corn gluten mixture. The urea solution was blended with the meal in the premix chamber of the extruder at a rate of 5 gal/hr (19 l/hr). Additional water was proportioned by a pump to supply a 30% moisture level to the mixture entering the extruder. The pH in the mixing chamber was lowered without the addition of acid.

The mixture was extruded through a nozzle to form an extrusion product, which was dried in a drying train to less than 10% moisture. The NPN delivery system thus formed contained about 13% urea by dry weight.

Forty grams of the system were ground to pass 60 mesh, then slurried in 160 ml water included with urease with agitation for one hour at room temperature. The slurry was then centrifuged and the clear liquid evaluated. It was observed that about 31% of the NPN from the urea remained in the complex after urease treatment.

EXAMPLE 6

Extrusion Process

This example illustrates an extrusion process similar to that of the preceding example, with a higher rate of addition of urea solution.

A NPN delivery system was prepared in accordance with Example 5, except that the rate of addition of the urea solution was 7 gal/hr (26.5 l/hr). The resulting dried extrudate contained 17% urea by dry weight.

EXAMPLE 7

Pellet Mill Process

This example illustrates a pellet mill process in accordance with the invention.

Sixty-nine parts corn gluten meal, three parts sodium carbonate, and twenty-eight parts urea were dry blended and admixed with water to increase the weight of the mixture by 10%. The mixture was put through a California Pellet Mill equipped with a 125 hp (93 kW) motor and a die to yield pellets of NPN delivery system having a diameter of 3/32 inch (0.25 cm). The temperature of the pellets exiting the pellet mill was about 60° C.

EXAMPLE 8

Pellet Mill Process

This example illustrates a second pellet mill process in accordance with the invention.

Pellets were prepared in accordance with the method of Example 7, except that the moisture content of the dry mixture was increased by 6%. In addition, 0.42% stearic acid was dry mixed in the gluten mixture to provide plasticity to the pellets. Pellets of an NPN delivery system having a diameter of 3/32 inch (0.25 cm) were formed thereby.

The pellets of Examples 7 and 8 were evaluated for urease-resistant complexed urea. In each case, 100 g of the pellets were ground to 60 mesh and extracted in 245 ml water at 50° C. The suspensions were stirred for 30 minutes while maintaining the pH at pH 8.5. Each slurry was centrifuged. In each case, about 155 ml liquid separated from the wet residue. Each liquid fraction was freeze-dried and the percentage of urease-resistant urea in each sample evaluated to determine the proportion of urea remaining complexed in the pellets. The following results were observed:

| Experiment | Urea content (after urease incubation)* |
|---|---|
| Example 7 | 13.6% |
| Example 8 | 11.4% |

*represents urea remaining in the system as a percentage of total initial urea.

These results were less favorable than those observed with respect to the extrusion process. The pelletizer operated at 60° C., a temperature that is somewhat lower that is preferred, and this may have contributed to the lower amount of urease-resistant urea observed. No thermoplastic mass was formed in the pelletizer. In addition, the residence time of the mixture in the pelletizer was very short, another factor that may have contributed to the lower amount of urease-resistant urea observed.

EXAMPLE 9

Batch Process with Amino Acid

This example illustrates the preparation of a gluten:urea complex used to entrap other species.

A complex was prepared in accordance with the method of Example 2, except that methionine was added to the urea:gluten mixture. After maintaining the elevated temperature for about 30 minutes, the pH was lowered to about pH 7.5–7.7 and a concentrated solution of lysine hydrochloride was added. The pH further decreased to about 7.0. The lysine was not added at the elevated pH to avoid alteration of the ε-amino group of lysine.

The composition, after assay, showed recovery of all of the lysine and methionine added. This recovery demonstrates that these amino acids can be added to the system and released essentially without loss.

EXAMPLE 10

Urea Release Evaluation

The NPN delivery systems of Examples 5 and 6 were evaluated in buffered rumen fluid. To a serum vial was added 33 ml rumen fluid, 67 ml buffer taken from steers adapted to urea, 500 mg ground diet, and 100 mg of the NPN delivery system. The vials were flushed with $CO_2$ and incubated. The ammonia concentration in the rumen fluid was evaluated at 0, 2, 4, and 6 hours. The following results were observed:

|  | Control urea & gluten mixture | System inc. 13% urea complex | System inc. 17% urea complex |
| --- | --- | --- | --- |
| $T_0$ (mean) | 0.96 | 0.99 | 1.00 |
| $T_2$ (mean) | 7.23 | 4.67 | 6.29 |
| $T_4$ (mean) | 7.08 | 4.30 | 5.21 |
| $T_6$ (mean) | 4.99 | 3.36 | 4.63 |

*values represent mg $NH_3$/dl fluid.

Data points for $T_8$ were discarded. It was believed that microbial cell lysis such as would ordinarily not be present in vivo affected the results after six hours.

These results demonstrate that ammonia was released from the NPN delivery system of the invention more slowly than with non-complexed urea.

The invention has been described more particularly with reference to zein-containing species, in particular, corn gluten. However, it should be understood that other proteinaceous species, such as perhaps prolamins other than zein, or other glutens, such as sorghum gluten, may find utility in connection with the present invention. So long as the proteinaceous species is capable of forming a complex with a nitrogenous species, such as urea, a complex including such other proteinaceous species should be considered to fall within the scope of the present invention. Likewise, while the method of the invention has been described with respect to solutions in aqueous media, it is contemplated that other media may be used in preparing the complex.

Thus, it is seen that the foregoing general objects have been satisfied. An NPN delivery system for a ruminant animal and a method for preparing the same have been provided. Inasmuch as the NPN delivery system is made in the preferred embodiment with corn gluten and urea, this preferred embodiment of the invention provides a highly nutritive NPN delivery system.

While particular embodiments of the invention have been shown, it should be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein are hereby incorporated by reference in their entireties.

What is claimed is:

1. A process for preparing a non-proteinaceous nitrogen (NPN) delivery system for a ruminant animal, the process comprising the steps of:

providing a zein-containing species;

blending a nitrogenous species with said zein-containing species to form a blend, said blend being an aqueous blend and having a basic pH;

extruding said blend through an extruder nozzle to thereby form a complex of said zein-containing species and said nitrogenous species; said nitrogenous species providing non-protein nitrogen to said ruminant animal, at least a portion of said nitrogenous species being present in said complex in a form such that said bioavailable non-protein nitrogen from said nitrogenous species is not initially bioavailable to said ruminant animal upon introduction of said system into the rumen of said ruminant animal and drying said complex.

2. A process according to claim 1, wherein the moisture content in the extruder ranges from 30% to 32%.

3. A process according to claim 1, wherein said nitrogenous species is provided in the form of a 35% to 55% aqueous solution.

4. An NPN delivery system prepared by the process of claim 1.

5. An NPN delivery system according to claim 4, wherein said zein-containing species is corn gluten.

6. An NPN delivery system according to claim 4, wherein said nitrogenous species is urea.

7. An NPN delivery system according to claim 4, wherein said NPN is present in said complex in an amount ranging from about 2% to about 20% NPN by weight of said system.

8. An NPN delivery system according to claim 7, wherein said NPN is present in said complex in an amount ranging from about 12% to about 17% by weight of said system.

9. An NPN delivery system according to claim 4, wherein said complex further includes a nutritive amino acid in an amount ranging from about 0.01% to about 15% by weight of said system.

10. An NPN delivery system according to claim 9, wherein said nutritive amino is present in an amount ranging from about 4% to about 8% by weight of said system.

11. An NPN delivery system according to claim 10, wherein said amino acid is selected from the group consisting of lysine, methionine, leucine, and arginine.

12. An NPN delivery system according to claim 10, wherein said amino acid is lysine.

13. An NPN delivery system according to claim 12, wherein about 60% to about 70% of the NPN in said complex is released to said ruminant animal after about 2 hours.

14. An NPN delivery system according to claim 13, wherein about 65% of the NPN said complex is released to said ruminant animal after about 2 hours.

15. A method for supplying NPN to the rumen of an animal, comprising the steps of:

providing the product of claim 4; and feeding said product to a ruminant animal.

16. A process for preparing an NPN delivery system for a ruminant animal, the process comprising the steps of:

providing a zein-containing species;

blending a nitrogenous species with zein-containing species to form a blend, said blend being an aqueous blend and having a basic pH; and pelletizing said blend with a pelletizing apparatus to thereby form a complex of said zein-containing species and said nitrogenous species; said nitrogenous species providing non-protein nitrogen to said ruminant animal, at least a portion of said nitrogenous species being present in said complex in a form such that said bioavailable non-protein nitrogen from said nitrogenous species is not initially bioavailable to said ruminant animal upon introduction of said system into the rumen of said ruminant animal.

17. An NPN delivery system prepared by the process of claim 16.

18. An NPN delivery system according to claim 17, wherein said zein-containing species is corn gluten.

19. An NPN delivery system according to claim 17, wherein said nitrogenous species is urea.

20. An NPN delivery system according to claim 17, wherein said NPN is present in said complex in an amount ranging from about 2% to about 20% NPN by weight of said system.

21. An NPN delivery system according to claim 20, wherein said NPN is present in said complex in an amount ranging from about 12% to about 17% by weight of said system.

22. An NPN delivery system according to claim 17, wherein said complex further includes a nutritive amino acid in an amount ranging from about 0.01% to about 15% by weight of said system.

23. An NPN delivery system according to claim 22, wherein said nutritive amino is present in an amount ranging from about 4% to about 8% by weight of said system.

24. An NPN delivery system according to claim 23, wherein said amino acid is selected from the group consisting of lysine, methionine, leucine, and arginine.

25. An NPN delivery system according to claim 23, wherein said amino acid is lysine.

26. An NPN delivery system according to claim 25, wherein about 60% to about 70% of the NPN in said complex is released to said ruminant animal after about 2 hours.

27. An NPN delivery system according to claim 26, wherein about 65% of the NPN said complex is released to said ruminant animal after about 2 hours.

28. A method for supplying NPN to the rumen of an animal, comnprising the steps of:

providing the product of claim 17; and feeding said product to a ruminant animal.

* * * * *

UNITED STATES PATENT AND TRADEMARK OFFICE
CERTIFICATE OF CORRECTION

PATENT NO. : 5,916,610
DATED : June 29, 1999
INVENTOR(S) : Witt et al.

It is certified that errors appear in the above-identified patent and that said Letters Patent is hereby corrected as shown below:

In column 9, line 28: "invention" should read -- invention. --.

Signed and Sealed this

Fourteenth Day of March, 2000

Attest:

Q. TODD DICKINSON

*Attesting Officer*  *Commissioner of Patents and Trademarks*

UNITED STATES PATENT AND TRADEMARK OFFICE
CERTIFICATE OF CORRECTION

PATENT NO. : 5,916,610
DATED : June 29, 1999
INVENTOR(S) : Witt et al.

It is certified that error appears in the above-identified patent and that said Letters Patent is hereby corrected as shown below:

On the title page item [73], change "Grain Processing Corporation" to -- Kent Feeds, Inc. --.

Signed and Sealed this

Fourth Day of July, 2000

Attest:

Q. TODD DICKINSON

*Attesting Officer*     *Director of Patents and Trademarks*